(12) United States Patent
Hou et al.

(10) Patent No.: US 9,568,717 B2
(45) Date of Patent: Feb. 14, 2017

(54) OFF-AXIS THREE-MIRROR OPTICAL SYSTEM WITH FREEFORM SURFACES

(71) Applicants: Tsinghua University, Beijing (CN); HON HAI PRECISION INDUSTRY CO., LTD., New Taipei (TW)

(72) Inventors: Wei Hou, Beijing (CN); Jun Zhu, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/814,499

(22) Filed: Jul. 30, 2015

(65) Prior Publication Data

US 2016/0170190 A1    Jun. 16, 2016

(30) Foreign Application Priority Data

Dec. 11, 2014    (CN) .......................... 2014 1 0756284

(51) Int. Cl.
*G02B 5/10*    (2006.01)
*G02B 17/06*    (2006.01)

(52) U.S. Cl.
CPC ............. *G02B 17/0636* (2013.01); *G02B 5/10* (2013.01); *G02B 17/0626* (2013.01); *G02B 17/0642* (2013.01)

(58) Field of Classification Search
CPC ............ G02B 17/0626; G02B 17/0636; G02B 17/0642; G02B 5/10
USPC ................................. 359/366, 729, 731, 859
See application file for complete search history.

(56) References Cited

U.S. PATENT DOCUMENTS

| 5,331,470 | A  | * | 7/1994 | Cook  | G02B 23/06 359/859 |
| 6,266,140 | B1 | * | 7/2001 | Xiang | G01J 3/18 356/305 |
| 8,975,571 | B2 | * | 3/2015 | Hou   | G02B 17/0621 250/208.1 |
| 9,250,428 | B2 | * | 2/2016 | Zhu   | G02B 17/0621 |
| 9,250,438 | B2 | * | 2/2016 | Yang  | G02B 26/0816 |
| 9,268,122 | B2 | * | 2/2016 | Zhu   | G01J 1/0414 |
| 9,268,123 | B2 | * | 2/2016 | Zhu   | G01J 1/42 |
| 9,405,109 | B2 | * | 8/2016 | Yang  | G02B 17/0642 |

(Continued)

FOREIGN PATENT DOCUMENTS

CN    203965040    11/2014

*Primary Examiner* — Ricky D Shafer
(74) *Attorney, Agent, or Firm* — Zhigang Ma

(57) ABSTRACT

An off-axis three-mirror optical system with freeform surfaces includes a primary mirror, a secondary mirror, a tertiary mirror, and an image sensor. The primary mirror receives light rays first and the secondary mirror is located on a path of light reflected from the primary mirror. The tertiary mirror receives light reflected from the secondary mirror. The image sensor is located on a path of light reflected from the tertiary mirror. Each reflecting surface of the primary and tertiary mirrors is a sixth order xy polynomial freeform surface. The secondary mirror reflecting surface is a spherical surface. A field of view of the off-axis three-mirror optical system with freeform surfaces in Y-axis direction is greater or equal to 65°. A field of view of the off-axis three-mirror optical system with freeform surfaces in X-axis direction is greater or equal to 0.8°.

14 Claims, 4 Drawing Sheets

(56) References Cited

U.S. PATENT DOCUMENTS

2013/0335839 A1* 12/2013 Cook .................. G02B 17/0636
  359/857
2015/0253554 A1* 9/2015 Yang .................. G02B 17/0642
  703/1
2015/0346468 A1* 12/2015 Zhu .................... G02B 17/0642
  250/216

* cited by examiner

OFF-AXIS THREE-MIRROR OPTICAL SYSTEM WITH FREEFORM SURFACES

CROSS-REFERENCE TO RELATED APPLICATIONS

This application claims all benefits accruing under 35 U.S.C. §119 from China Patent Application No. 201410756284.7, field on Dec. 11, 2014 in the China Intellectual Property Office, disclosure of which is incorporated herein by reference. The application is also related to copending applications entitled, "METHOD FOR DESIGNING OFF-AXIS THREE-MIRROR IMAGING SYSTEM WITH FREEFORM SURFACES", filed on Jul. 30, 2015 and having application Ser. No. 14/814,497.

BACKGROUND

1. Technical Field

The present disclosure relates to an off-axis optical system.

2. Description of Related Art

Compared with conventional rotationally symmetric surfaces, freeform surfaces have asymmetric surfaces and more degrees of freedom in design, which can reduce aberrations and simplify the structure of the reflective system. Thus, freeform surfaces are often used in off-axis three-mirror optical systems.

However, the mirrors in conventional off-axis three-mirror system are mostly spherical or aspheric surfaces. There are more factors, such as volume, weight, and the number of lenses, to be considered during the designing process; it is difficult to design off-axis three-mirror optical systems with simple structure and excellent imaging. In addition, conventional off-axis three-mirror optical systems with spherical surfaces or aspherical surfaces make it difficult to achieve multiple fields imaging with large field of view (FOV), such as more than 60°.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the freeform surface reflective scanning system.

DETAILED DESCRIPTION

Figure 1:
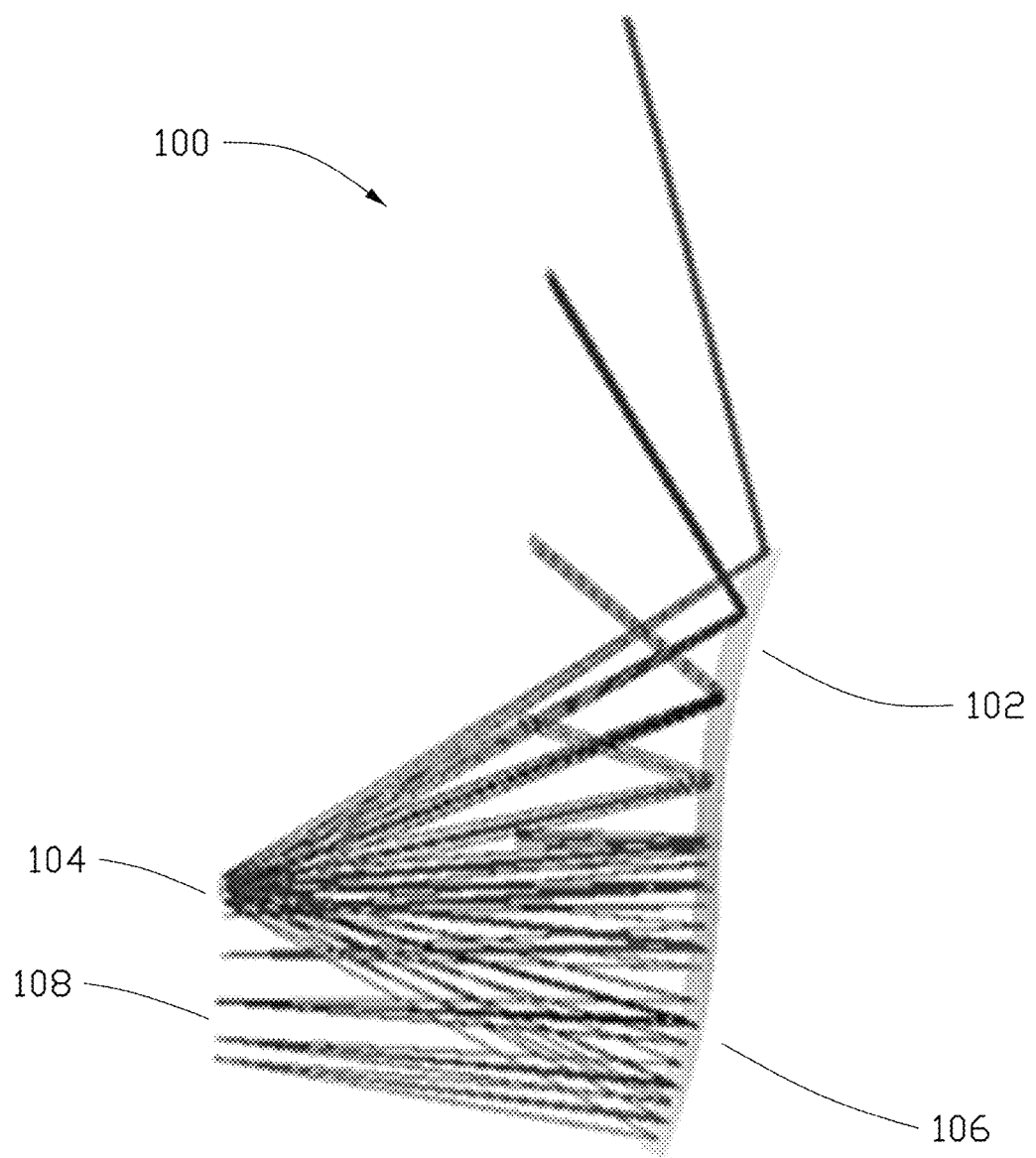
FIG. 1 is a three-dimensional configuration schematic view of light paths on an off-axis three-mirror optical system with freeform surfaces according to one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series, and the like. It should be noted that references to "one" embodiment in this disclosure are not necessarily to the same embodiment, and such references mean "at least one."

Figure 2:
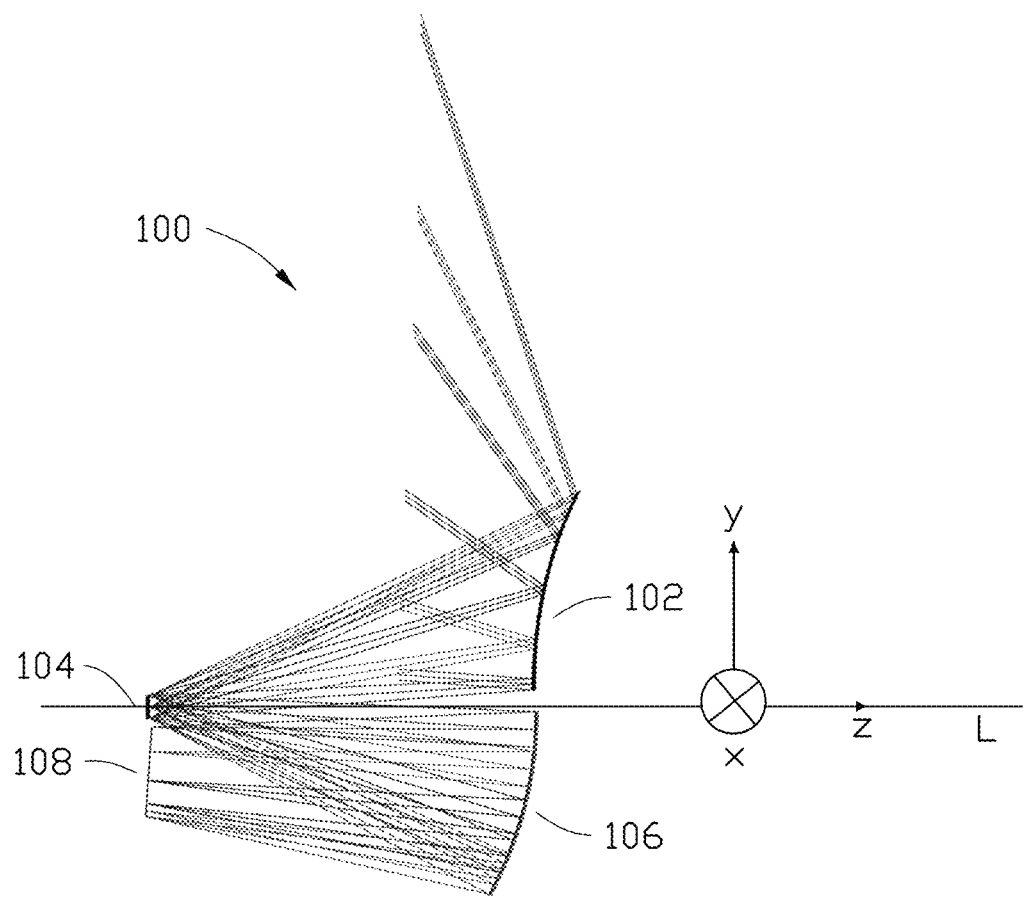
FIG. 2 is a schematic view of an off-axis three-mirror optical system with freeform surfaces according to one embodiment.

Referring to FIGS. 1-2, an off-axis three-mirror optical system with freeform surfaces 100 of one embodiment is provided. The off-axis three-mirror optical system with freeform surfaces 100 includes a primary mirror 102, a secondary mirror 104, a tertiary mirror 106, and an image sensor 108. The primary mirror 102 is located on a path of light rays from object space, and the secondary mirror 104 is located on a path of light reflected from the primary mirror 102. The tertiary mirror 106 is located on a path of light reflected from the secondary mirror 104 and the image sensor 108 is located on a path of light reflected from the tertiary mirror 106. A reflecting surface of the primary mirror 102 and a reflecting surface of the tertiary mirror 106 are freeform surfaces. A reflecting surface of the secondary mirror 104 is a spherical surface. The secondary mirror 104 is an aperture stop of the off-axis three-mirror optical system with freeform surfaces 100.

A light path of the off-axis three-mirror optical system with freeform surfaces 100 can be depicted as follows. Firstly, a light ray from the object space reaches the primary mirror 102, and is reflected by the primary mirror 102 to form a first reflected light. Secondly, the first reflected light reaches the secondary mirror 104, and is reflected by the secondary mirror 104 to form a second reflected light. Thirdly, the second reflected light reaches the tertiary mirror 106, and is reflected by the tertiary mirror 106 to form a third reflected light. Finally, the third reflected light is received by the image sensor 108.

The reflecting surface of the primary mirror 102 is convex, and the reflecting surface of the tertiary mirror 106 is concave, conferring an ultra-wide field-of-view (FOV) to the off-axis three-mirror optical system with freeform surfaces 100.

A horizontal line passing through the center of the secondary mirror 104 is defined as a Z-axis, and in the Z-axis, to the left is negative, and to the right is positive. A Y-axis is in a plane shown in FIG. 2, and in the Y-axis, in a direction perpendicular to the Z-axis, to the upward is positive, and to the downward is negative. An X-axis is perpendicular to YZ plane, and in the X-axis, in a direction perpendicular to the YZ plane, to the inside is positive, and to the outside is negative.

In one embodiment, each of the reflecting surface of the primary mirror 102 and the reflecting surface of the tertiary mirror 106 is an xy polynomial freeform surface. An equation of the xy polynomial freeform surface can be expressed as follows:

$$z(x, y) = \frac{c(x^2 + y^2)}{1 + \sqrt{1 - (1+k)c^2(x^2 + y^2)}} + \sum_{i=1}^{N} A_i x^m y^n.$$

In the equation, z represents surface sag, c represents surface curvature, k represents conic constant, while $A_i$ represents the $i^{th}$ term coefficient. Since the off-axis three-mirror optical system with freeform surfaces 100 is symmetrical about YOZ plane, so only even-order terms of x can remain. At the same time, higher order terms will increase the fabrication difficulty of the off-axis three-mirror optical system with freeform surfaces 100. In one embodiment, each of the reflecting surfaces of the primary mirror 102 and the tertiary mirror 106 is a sixth order xy polynomial freeform surface without odd items of x. An equation of the sixth order xy polynomial freeform surface can be expressed as follows:

$$z(x, y) = \frac{c(x^2 + y^2)}{1 + \sqrt{1 - (1+k)c^2(x^2 + y^2)}} + A_2 y + A_3 x^2 +$$
$$A_5 y^2 + A_7 x^2 y + A_9 y^3 + A_{10} x^4 + A_{12} x^2 y^2 + A_{14} y^4 + A_{16} x^4 y +$$
$$A_{18} x^2 y^3 + A_{20} y^5 + A_{21} y^6 + A_{23} x^4 y^2 + A_{25} x^2 y^4 + A_{27} y^6.$$

In one embodiment, the values of c, k, and $A_i$ in the equation of the reflecting surface of the primary mirror 102 are listed in TABLE 1. The values of c, k, and $A_i$ in the equation of the reflecting surface of the tertiary mirror 106 are listed in TABLE 2. However, the values of c, k, and $A_i$ are not limited to TABLE 1 and TABLE 2.

TABLE 1

| | |
|---|---|
| c | 0.015829510111472 |
| k | −0.978764953150227 |
| $A_2$ | 0.261749508385724 |
| $A_3$ | −0.00743406713869455 |
| $A_5$ | −0.00714947619951034 |
| $A_7$ | 3.82046116028421e−007 |
| $A_9$ | 5.74086859477607e−007 |
| $A_{10}$ | −4.171364353099e−009 |
| $A_{12}$ | −1.95250755447043e−008 |
| $A_{14}$ | −9.48643555405167e−009 |
| $A_{16}$ | 5.17345962568814e−012 |
| $A_{18}$ | −1.13479031660653e−011 |
| $A_{20}$ | 3.22403620147984e−012 |
| $A_{21}$ | −2.50988689628815e−011 |
| $A_{23}$ | −6.81980140588623e−014 |
| $A_{25}$ | −2.48345139372518e−014 |
| $A_{27}$ | −3.02262720110543e−014 |

TABLE 2

| | |
|---|---|
| c | 0 |
| k | 0 |
| $A_2$ | 0.186647862869921 |
| $A_3$ | −0.000927550473784139 |
| $A_5$ | −0.00104468913329609 |
| $A_7$ | 4.98166333526883e−007 |
| $A_9$ | 6.04945962435827e−007 |
| $A_{10}$ | −5.80629680465291e−010 |
| $A_{12}$ | −2.37336382560754e−009 |
| $A_{14}$ | −1.60605187051182e−009 |

TABLE 2-continued

| | |
|---|---|
| $A_{16}$ | 1.16034788758175e−012 |
| $A_{18}$ | 3.36714985922726e−012 |
| $A_{20}$ | 1.88376694788092e−012 |
| $A_{21}$ | −2.90094084284381e−013 |
| $A_{23}$ | −5.30679733169097e−015 |
| $A_{25}$ | −7.94068964082e−015 |
| $A_{27}$ | −2.50478751471803e−015 |

The reflecting surface of the secondary mirror 104 is a spherical surface. An equation of the spherical surface can be expressed as follows:

$$z(x, y) = \frac{c(x^2 + y^2)}{1 + \sqrt{1 - c^2(x^2 + y^2)}}.$$

In the equation of the spherical surface, z represents surface sag, and c represents surface curvature. In one embodiment, c=−8.246528177e-5. However, the value of c can be selected according to actual need.

The primary mirror 102 and the tertiary mirror 106 are approximate continuous tangent. Therefore, the primary mirror 102 and the tertiary mirror 106 can be fabricated on one element, and the off-axis three-mirror imaging system with freeform surfaces 100 is easier to be assembled and aligned.

The materials of the primary mirror 102, the secondary mirror 104, and the tertiary mirror 106 can be aluminum, beryllium, or other metals. The materials of the primary mirror 102, the secondary mirror 104, and the tertiary mirror 106 can also be silicon carbide, quartz, or other mineral or inorganic materials. A reflection enhancing coating can also be put on the metals or inorganic materials to enhance the reflectivity performance of the three mirrors. In one embodiment, the reflection enhancing coating is a gold film.

A distance between the primary mirror 102 and the secondary mirror 104, along a Z-axis direction, is in a range from about 370 mm to about 371 mm. A distance between the secondary mirror 104 and the tertiary mirror 106, along the Z-axis direction, is in a range from about 319 mm to about 320 mm. A distance between the tertiary mirror 106 and the image sensor 108, along the Z-axis direction, is in a range from about 315 mm to about 316 mm. In one embodiment, the distance between the primary mirror 102 and the secondary mirror 104, along the Z-axis direction, is 370.03 mm. A distance between the secondary mirror 104 and the tertiary mirror 106, along the Z-axis direction, is 319.23 mm. A distance between the tertiary mirror 106 and the image sensor 108, along the Z-axis direction, is 315.73 mm.

The image sensor 108 can be a charge-coupled device (CCD) type or a complementary metal-oxide semiconductor (CMOS) type. In one embodiment, a planar array CCD is employed as the image sensor 108, and a pixel size of the planar array CCD is about 5 μm×5 μm.

An effective entrance pupil diameter of the off-axis three-mirror optical system with freeform surfaces 100 is about 13 mm.

The primary mirror 102, the secondary mirror 104, and the tertiary mirror 106 adopt an off-axis FOV in Y-axis direction. The FOV of the off-axis three-mirror optical system with freeform surfaces 100 in the Y-axis direction is greater or equal to 65°. The FOV of the off-axis three-mirror optical system with freeform surfaces 100 in the X-axis direction is greater or equal to 0.8°. In one embodiment, the FOV of the off-axis three-mirror optical system with freeform surfaces 100 is about 70°×1°, wherein the FOV along the X-axis direction is in a range from about −0.5° to about 0.5°, and the FOV along the Y-axis direction is in a range from about −5° to about −75°.

An effective focal length (EFL) of the off-axis three-mirror optical system with freeform surfaces 100 is about 75 mm.

A wavelength of the off-axis three-mirror optical system with freeform surfaces 100 is not limited. In one embodiment, the wavelength of the off-axis three-mirror optical system with freeform surfaces 100 is in visible spectrum.

The relative aperture (D/f) of the off-axis three-mirror optical system with freeform surfaces 100 is about 0.1724; and F-number of the off-axis three-mirror optical system with freeform surfaces 100 is a D/f reciprocal, the F-number is about 5.8.

Figure 3:
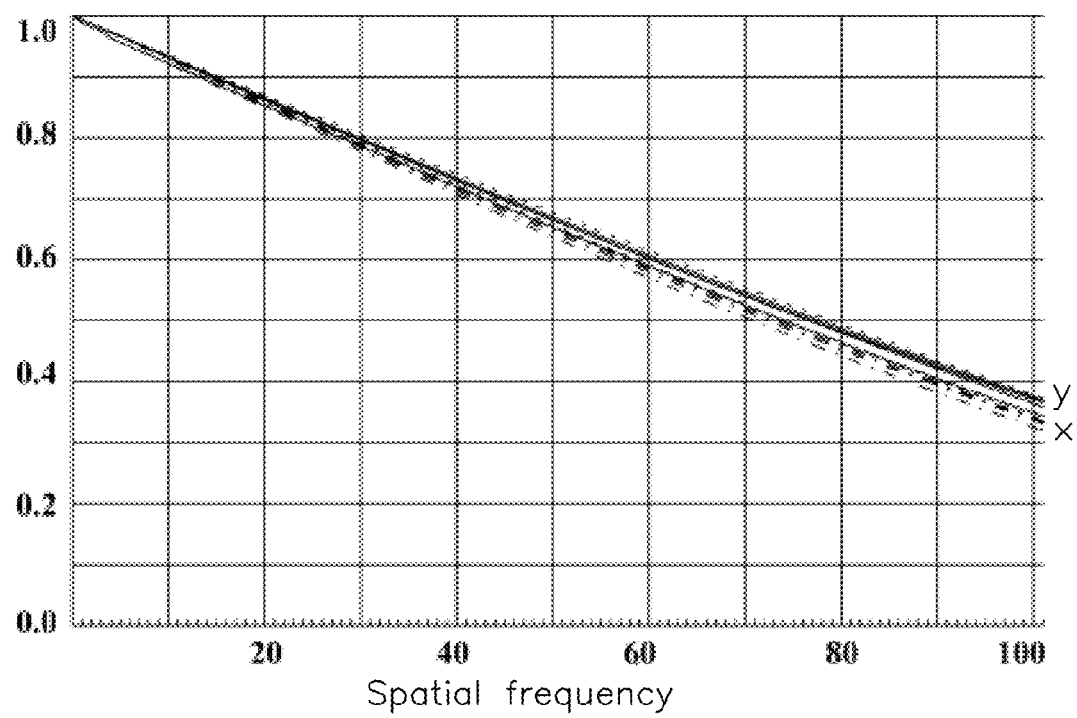
FIG. 3 is a graph showing modulation transfer function (MTF) curves of partial field angles of an off-axis three-mirror optical system with freeform surfaces according to one embodiment.

Referring to FIG. 3, the MTF of the off-axis three-mirror optical system with freeform surfaces 100 in visible spectrum of partial field angles are higher than 0.3. It shows that imaging quality of the off-axis three-mirror optical system with freeform surfaces 100 is high.

Figure 4:
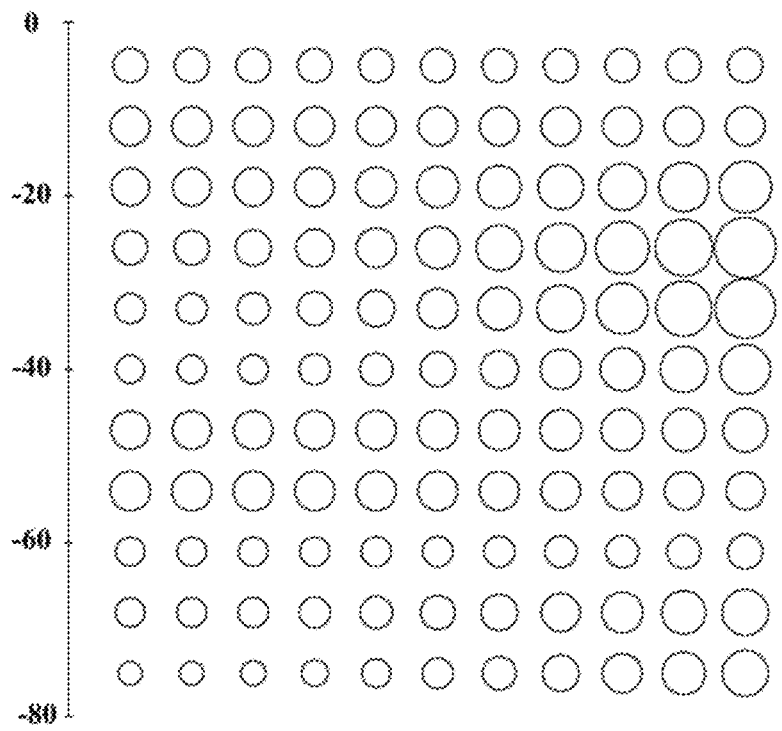
FIG. 4 is a graph showing an RMS wavefront error of an off-axis three-mirror optical system with freeform surfaces according to one embodiment.

Referring to FIG. 4, the RMS wavefront error of the off-axis three-mirror optical system with freeform surfaces 100 is shown. It can be seen that the maximum value of the RMS wavefront error is about λ/32, and the average value of the RMS wavefront error is about λ/55. It shows that the RMS wavefront error of the off-axis three-mirror optical system with freeform surfaces 100 is small, therefore the imaging quality of the off-axis three-mirror optical system with freeform surfaces 100 is high.

The off-axis three-mirror optical system with freeform surfaces 100 can have many advantages.

The primary mirror 102 and the tertiary mirror 106 are both freeform surfaces. Such surfaces are asymmetric and allow more degrees of freedom in design, which can reduce the aberrations and simplify the structure of the off-axis three-mirror optical system with freeform surfaces 100.

Design complexity is less, thus the off-axis three-mirror optical system with freeform surfaces 100 is easier to be fabricated and assembled.

The primary mirror 102 and the tertiary mirror 106 are approximate continuous tangent, the primary mirror 102 and the tertiary mirror 106 can be fabricated on one element. This simplifies assembly and alignment.

The FOV of the off-axis three-mirror optical system with freeform surfaces 100 is about 70°×1°, thus the off-axis three-mirror optical system with freeform surfaces 100 can achieve multiple fields imaging with larger FOV, and larger imaging range.

The above-described contents are detailed illustrations with specific and preferred embodiments for the present disclosure. The implementation of the present disclosure is not limited to these illustrations. For one of ordinary skill in the art, variations and equivalents having the same effects and applications can be made without departing from the spirit of the present disclosure and should be seen as belonging to the scope of the present disclosure.

What is claimed is:

1. An off-axis three-mirror optical system with freeform surfaces comprising:
   a primary mirror located on a path of a light ray from a object space and configured to reflect the light ray to form a first reflected light, wherein the primary mirror comprises a first reflecting surface;
   a secondary mirror located on a first path of light reflected from the primary mirror and configured to reflect the first reflected light to form a second reflected light, wherein the secondary mirror comprises a second reflecting surface, and the secondary mirror is an aperture stop;
   a tertiary mirror located on a second path of light reflected from the secondary mirror and configured to reflect the second reflected light to form a third reflected light, wherein the tertiary mirror comprises a third reflecting surface; and
   an image sensor located on a third path of light reflected from the tertiary mirror and configured to receive the third reflected light;
   wherein each of the first reflecting surface and the third reflecting surface is a sixth order xy polynomial freeform surface, the second reflecting surface is a spherical surface; and a first field of view of the off-axis three-mirror optical system with freeform surfaces in a Y-axis direction is greater or equal to 65°, a second field of view of the off-axis three-mirror optical system with freeform surfaces in an X-axis direction is greater or equal to 0.8°.

2. The system as claimed in claim 1, wherein the sixth order xy polynomial freeform surface satisfies an equation:

$$z(x, y) = \frac{c(x^2 + y^2)}{1 + \sqrt{1 - (1+k)c^2(x^2 + y^2)}} + A_2 y + A_3 x^2 + A_5 y^2 + A_7 x^2 y + A_9 y^3 + A_{10} x^4 + A_{12} x^2 y^2 + A_{14} y^4 + A_{16} x^4 y + A_{18} x^2 y^3 + A_{20} y^5 + A_{21} y^6 + A_{23} x^4 y^2 + A_{25} x^2 y^4 + A_{27} y^6.$$

wherein, c represents surface curvature, k represents conic constant, and $A_2 \sim A_{27}$ represent coefficients.

3. The system as claimed in claim 2, wherein in the equation of the primary mirror reflecting surface, c, k, and $A_2 \sim A_{27}$ are:

| | |
|---|---|
| c | 0.015829510111472 |
| k | −0.978764953150227 |
| $A_2$ | 0.261749508385724 |
| $A_3$ | −0.00743406713869455 |
| $A_5$ | −0.00714947619951034 |
| $A_7$ | 3.82046116028421e−007 |
| $A_9$ | 5.74086859477607e−007 |
| $A_{10}$ | −4.171364353099e−009 |
| $A_{12}$ | −1.95250755447043e−008 |
| $A_{14}$ | −9.48643555405167e−009 |
| $A_{16}$ | 5.17345962568814e−012 |
| $A_{18}$ | −1.13479031660653e−011 |
| $A_{20}$ | 3.22403620147984e−012 |
| $A_{21}$ | −2.50988689628815e−011 |
| $A_{23}$ | −6.81980140588623e−014 |
| $A_{25}$ | −2.48345139372518e−014 |
| $A_{27}$ | −3.02262720110543e−014. |

4. The system as claimed in claim 2, wherein in the equation of the tertiary mirror reflecting surface, c, k, and $A_2 \sim A_{27}$ are:

| | |
|---|---|
| c | 0 |
| k | 0 |
| A2 | 0.186647862869921 |
| A3 | −0.000927550473784139 |
| A5 | −0.00104468913329609 |
| A7 | 4.98166333526883e−007 |
| A9 | 6.04945962435827e−007 |
| A10 | −5.80629680465291e−010 |
| A12 | −2.37336382560754e−009 |

-continued

| | |
|---|---|
| A14 | −1.60605187051182e−009 |
| A16 | 1.16034788758175e−012 |
| A18 | 3.36714985922726e−012 |
| A20 | 1.88376694788092e−012 |
| A21 | −2.90094084284381e−013 |
| A23 | −5.30679733169097e−015 |
| A25 | −7.94068964082e−015 |
| A27 | −2.50478751471803e−015. |

5. The system as claimed in claim 1, wherein an equation of the spherical surface is $$z(x, y) = \frac{c(x^2 + y^2)}{1 + \sqrt{1 - c^2(x^2 + y^2)}},$$

z represents surface sag, c represents surface curvature.

6. The system as claimed in claim 5, wherein c=−8.246528177e-5.

7. The system as claimed in claim 1, wherein the second field of view along the X-axis direction is about 1°.

8. The system as claimed in claim 1, wherein the second field of view along the X-axis direction is in a range from about −0.5° to about 0.5°.

9. The system as claimed in claim 1, wherein the first field of view along the Y-axis direction is about 70°.

10. The system as claimed in claim 1, wherein the first field of view along the Y-axis direction is in a range from about −5° to about −75°.

11. The system as claimed in claim 1, wherein a horizontal line passing through a center of the secondary mirror is defined as a Z-axis, a distance between the primary mirror and the secondary mirror along the Z-axis is in a range from about 370 mm to about 371 mm; a distance between the secondary mirror and the tertiary mirror along the Z-axis is in a range from about 319 mm to about 320 mm; and a distance between the tertiary mirror and the image sensor along the Z-axis is in a range from about 315 mm to about 316 mm.

12. The system as claimed in claim 1, wherein an effective entrance pupil diameter of the off-axis three-mirror optical system with freeform surfaces is about 13 mm.

13. The system as claimed in claim 1, wherein an effective focal length of the off-axis three-mirror optical system with freeform surfaces is about 75 mm.

14. The system as claimed in claim 1, wherein a F-number of the off-axis three-mirror optical system with freeform surfaces is about 5.8.

* * * * *